United States Patent
Hsi et al.

(10) Patent No.: US 6,917,907 B2
(45) Date of Patent: Jul. 12, 2005

(54) METHOD OF POWER STEERING HOSE ASSEMBLY DESIGN AND ANALYSIS

(75) Inventors: Morris Hsi, Northville, MI (US); Chris Brown, Seattle, WA (US); Christian Fernholz, New Boston, MI (US); John Lawrence, Greenfield, IN (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 952 days.

(21) Appl. No.: 09/726,076

(22) Filed: Nov. 29, 2000

(65) Prior Publication Data

US 2002/0065639 A1 May 30, 2002

(51) Int. Cl.⁷ .................................................. G06G 7/48
(52) U.S. Cl. ........................ 703/8; 703/1; 703/6; 703/7; 703/9
(58) Field of Search ................................ 180/165, 417; 345/919, 920; 475/27; 700/95, 97, 98, 117; 703/1, 6–9; 706/919, 920

(56) References Cited

U.S. PATENT DOCUMENTS

| | | | |
|---|---|---|---|
| 4,696,225 A | 9/1987 | Weller | |
| 4,882,692 A | 11/1989 | Saxton et al. | |
| 5,031,111 A | 7/1991 | Chao et al. | |

(Continued)

FOREIGN PATENT DOCUMENTS

EP    1 113 373 A2    7/2001

OTHER PUBLICATIONS

Ned L. Brown, "Using a computer aided graphics system to help design and draft automotive components", Annual ACM IEEE Design Automation Conference, pp. 112–117, 1977.*

Phillips et al. "A knowledge system for automatic finite element mesh generation: AMEKS", ACM, pp. 668–678, 1988.*

(Continued)

*Primary Examiner*—Leo Picard
*Assistant Examiner*—Carlos Ortiz Rodriguez
(74) *Attorney, Agent, or Firm*—Brinks Hofer Gilson & Lione

(57) ABSTRACT

A method at power steering hose assembly design and analysis for a power steering system in a vehicle includes the steps of selecting a mesh model of a design for a power steering system having a power steering hose assembly, selecting a predetermined characteristic of the power steering system for a predetermined operating condition, performing an acoustic analysis on the mesh mocel using the predetermined characteristic and determining an acoustic response cf the power steering hose assembly from the acoustic analysis. The method further includes the steps of determining a noise transmission loss across the power steering hose assembly using the acoustic response, determining whether the transmission loss meets a predetermined noise criteria and modifying a design parameter for the power steering system if the transmission loss does not meet a predetermine noise criteria.

19 Claims, 3 Drawing Sheets

U.S. PATENT DOCUMENTS

| | | | |
|---|---|---|---|
| 5,119,309 A | | 6/1992 | Cavendish et al. |
| 5,197,120 A | | 3/1993 | Saxton et al. |
| 5,291,748 A | | 3/1994 | Ueda |
| 5,293,479 A | | 3/1994 | Quintero et al. |
| 5,315,530 A | * | 5/1994 | Gerhardt et al. ............ 700/282 |
| 5,631,861 A | | 5/1997 | Kramer |
| 5,754,738 A | | 5/1998 | Saucedo et al. |
| 5,792,031 A | | 8/1998 | Alton |
| 5,793,382 A | | 8/1998 | Yerazunis et al. |
| 5,799,293 A | | 8/1998 | Kaepp |
| 5,831,584 A | | 11/1998 | Socks et al. |
| 5,846,086 A | | 12/1998 | Bizzi et al. |
| 5,856,828 A | | 1/1999 | Letcher, Jr. |
| 5,921,780 A | | 7/1999 | Myers |
| 5,930,155 A | | 7/1999 | Tohi et al. |
| 5,953,517 A | | 9/1999 | Yin et al. |
| 5,963,891 A | | 10/1999 | Walker et al. |
| 6,021,270 A | | 2/2000 | Hanaki et al. |
| 6,036,345 A | | 3/2000 | Jannette et al. |
| 6,037,945 A | | 3/2000 | Loveland |
| 6,084,590 A | | 7/2000 | Robotham et al. |
| 6,088,521 A | * | 7/2000 | Strumolo et al. ............... 703/8 |
| 6,090,148 A | | 7/2000 | Weber et al. |
| 6,096,086 A | | 8/2000 | Weber et al. |
| 6,096,087 A | | 8/2000 | Weber et al. |
| 6,110,216 A | | 8/2000 | Weber et al. |
| 6,113,643 A | | 9/2000 | Weber et al. |
| 6,113,644 A | | 9/2000 | Weber et al. |
| 6,116,766 A | * | 9/2000 | Maseeh et al. ............... 700/97 |
| 6,119,125 A | | 9/2000 | Gloudeman et al. |
| 6,209,794 B1 | | 4/2001 | Webster et al. |
| 6,253,167 B1 | | 6/2001 | Matsuda et al. |
| 6,256,603 B1 | * | 7/2001 | Celniker ...................... 703/10 |
| 6,273,724 B1 | | 8/2001 | Roytman |
| 6,415,851 B1 | | 7/2002 | Hall et al. |
| 6,420,698 B1 | | 7/2002 | Dimsdale |
| 6,477,517 B1 | | 11/2002 | Limaiem et al. |
| 6,477,518 B1 | | 11/2002 | Li et al. |
| 6,482,082 B1 | | 11/2002 | Derleth et al. |
| 6,487,525 B1 | | 11/2002 | Hall et al. |
| 6,535,211 B1 | * | 3/2003 | Hariya et al. ................ 345/423 |
| 2002/0000996 A1 | | 1/2002 | Trika |
| 2002/0140633 A1 | | 10/2002 | Rafii et al. |
| 2003/0134676 A1 | | 7/2003 | Kang |

OTHER PUBLICATIONS

Yu, Jinghong, Johnson, Frank, Iwami,Fumihiro, Verrecchia Nick, Kojima, Eilchi, Experimental Evaluation fo a Fluid-borne Noise Attenuation in Tuning Cables and Hoses of Automotive Power Steering Hydraulic Systems, May 17–20, 1999 Noise and Vibration Conference & Exposition, Traverse City, MI, Society of Automotive Engineers, Inc.

Qatu, Mohamad S., Dougherty, Sr., Mike L., Smid, G. Edzko, Effects of Tuner Parameters on Hydraulic Noise and Vibration, May 17–20, 2000 Noise and Vibration Conference & Exposition, Traverse City, MI, Society of Automotive Engineers, Inc.

Hastings, Mardi C., Chen, Chuan–Chiang, Proceedings of the 1993 Noise and Vibration Conference, May 1993, Society of Automotive Engineers, Inc.

Botti, Jean, Venizelos G., Benkaza N., Optimization of Power Steering Systems Vibration Reduction in Passenger Cars, Delphi Corporation.

Albright, Michael F., Staffeld, Douglas F., Noise and Vibration Refinement of the Ford 3.8 Liter Powertrain,Ford Motor Company.

"Interactive Graphics Package For Human Engineering And Layout Of Vehicle Workspace", Gerald F. Rabideau and James Farnady, Department of Systems Design, University of Waterloo, Waterlloo, Ontario, Canada, 1976.

"Simulation–Aided Design of Man/Machine Interfaces in Automated Industries", Gary I. Davis and James R. Buck, School of Industrial Engineering, Purdue University, West Lafayette, Indiana, 1981.

"RAPID: Prototyping Control Panel Interfaces", Karl Freburger, OOPSLA '87 Proceedings, Oct. 4–8, 1987.

Lehner et al., "Distributed Virtual Reality: Supporting Remote Collaboration in Vehicle Design", IEEE 1997.

Purschke et al., "Virtual Reality–NewMethods for Improving and Accelerating the Development Process in Vehicle Styling and Design", IEEE 1998.

"The Introduction of Knowledge based Engineering for Design for Manufacture in the Automotive Industry", G.S. Wallace, Successful Cases of Integrated Product Design with Manufacturing Technology (Digest No.: 1997/168), IEE Colloquium on, pp. 7/1–7/5, May 1997.

"Knowledge Based Total Product Engineering", A.P. Harper, Successful Cases of Integrated Product Design with Manufacturing Technology (Digest No.: 1997/168), IEE Colloquium on, pp. 5/1–5/2, May 1997.

Lafon, "Solid Modeling With Constraints and Parameterised Features", IEEE, Jul. 1998.

Jinsong et al., "Parametric Design with Intelligence Configuration Analysis Mechanism", IEEE, Nov. 1993.

Mateos et al., "Parametric and Associative Design of Cartridges for Special Tools", IEEE 1995.

M. E. Gleason et al., "Automotive Climate Control Simulation Using CFD", Cray Channels, vol. 16, No. 2, 1994, pp. 4–7, XP008018557.

E. Augier, "Numerical and Experimental Study of Airflow In A HVAC Module", International Symposium on Automotive Technology and Automation, Jun. 3, 1996, pp. 59–66, XP008018546.

J. Currie, "Application of Computational Fluid Dynamics for the Optimization of Air Ducts", Isata 29th International Symposium on Automotive Technology and Automation, Proceedings of Conference on Supercomputer Applications in the Transportation Industries, Florence, Italy, Jun. 3–6, 1996, pp. 115–123, XP008021112 1996, Croydon, United Kingdom Automotive Autom, United Kingdom.

G. Anderson et al., "Computational Fluid Dynamics (CFD)", Engineering Designer, Mar.–Apr. 1997, Instn. Eng. Designers, United Kingdom, vol. 23, No. 2, pp. 16–17, XP008021114, ISSN: 0013–7898.

T. D. Hogg, "Rapid Prototyping Through Computational Fluid Dynamics (CFD)", Fifth International Conference on Factory 2000—The Technology Exploitation Process (Conf. Publ. No. 435), Cambridge, United Kingdom, Apr. 2–4, 1997, pp. 113–117, XP002252364 1997, London, United Kingdom, IEE, United Kingdom ISBN: 0–85296–682–2.

Artificial Intelligence (Understanding Computers), by Time–Life Books, 1986, ISBN 0–8094–5675–3, pp. 36–43.

Juran on Quality by Design, by J.M. Juran, The Free Press, 1992, ISBN 0–02–916683–7, pp. 406–427, and 462–467.

The Computer Science and Engineering Handbook, by Allen B. Tucker, CRC Press, ISBN: 0–8493–2909–4, 1996, p. 1954.

* cited by examiner

US 6,917,907 B2

METHOD OF POWER STEERING HOSE ASSEMBLY DESIGN AND ANALYSIS

BACKGROUND OF THE INVENTION

1. Field of the Invention

The present invention relates generally to computer-aided design and, more specifically, to a method of power steering hose assembly design and analysis for a power steering system in a vehicle.

2. Description of the Related Art

A consumer's purchase decision regarding a product is influenced by both subjective and objective perceptions of the product. With respect to a product such as a vehicle, and in particular an automotive vehicle, the consumer perceives interior quietness as a desirable feature. To satisfy this consumer preference, it is advantageous for a vehicle designer to identify and minimize a potential source of noise, vibration or harshness (NVH) early in the design process.

A known source of noise within the interior of the vehicle is from a hydraulically-assisted power steering system. The power steering system includes a power steering pump that initiates a pressure ripple, which interacts with a hydraulic circuit and propagates throughout the power steering system as fluid-borne noise. Various noise reduction techniques are used to minimize the noise of the power steering system. For example, an attenuation device such as a flexible tuning cable is disposed within a power steering hose assembly, and in particular a high-pressure power steering hose assembly. The flexible tuning cable relies on a process of destructive interference to attenuate the pressure ripple. Through a series of reflections, the tuning cable induces a 180° phase difference in the pressure ripple, that ultimately reduces the amplitude of the pressure ripple. Advantageously, the length of the cable is adjustable to vary the attenuation ability of the tuning cable.

Another example of a noise reduction technique is structural damping, whereby the hose assembly length is increased so that any expansion of the hose wall assists in absorbing the energy from the pressure ripple. In addition, the hose reduces the wave speed in the fluid, thus shortening the pressure ripple wavelength and increasing the effectiveness of the tuning cable.

While these noise reduction techniques work well, it is advantageous to predict the NVH characteristics of the power steering system, and the effectiveness of a noise reduction technique, early in the design process. In the past, the NVH characteristics of the power steering system, and in particular the power steering hose assembly were predicted using a combination of analytical, empirical, or experimental methodologies. An example of an experimental methodology is trial and error using a physical model. However, this methodology type is time consuming and costly. An example of an analytical methodology is a model of the power steering system represented by a set of equations resulting in a closed form solution. A closed form solution is an exact answer to a given set of equations. However, as power steering system models become increasingly complex, due to the nonlinear nature of the system, the complexity of the solution also increases. Therefore, analytical tools are not easy to use and are frequently constrained to analysis of simplified geometry and material properties. Thus, there is a need in the art for a method of power steering system hose assembly design and analysis that accurately and rapidly assesses the NVH characteristics of the system, including transfer loss, fluid flow characteristics, system vibration, and airborne noise prediction.

SUMMARY OF THE INVENTION

Accordingly, the present invention is a method of power steering hose assembly design and analysis for a power steering system in a vehicle. The method includes the steps of selecting a design for a power steering system from a database stored in a memory of a computer system, wherein the power steering system includes a power steering hose assembly having a noise attenuation device, and generating a mesh model of the power steering hose assembly from the power steering hose assembly design. The method also includes the steps of selecting a predetermined characteristic of the power steering system for a predetermined operating condition of the vehicle, performing an acoustic analysis on the mesh model of the power steering hose assembly using the predetermined characteristic and determining an acoustic response of the power steering hose assembly from the acoustic analysis. The method further includes the steps of determining a noise transmission loss across the power steering hose assembly using the acoustic response, determining whether the transmission loss meets a predetermined noise criteria and modifying a design parameter for the power steering system if the transmission loss does not meet a predetermined noise criteria or using a power steering hose assembly design and analysis if the transmission loss does meet a predetermined criteria.

One advantage of the present invention is that a method of power steering hose assembly design and analysis for a power steering system in a vehicle is provided that uses numerical analytical tools to quickly evaluate noise, vibration and harshness characteristics of a design for the system. Another advantage of the present invention is that the method utilizes a numeric finite element analysis technique to rapidly predict the NVH characteristics of a power steering hose assembly design. Still another advantage of the present invention is that the effect of modifications to a power steering hose assembly design on the NVH characteristics can be assessed quickly. A further advantage of the present invention is that a method is provided that reduces design time and related expenses. Still a further advantage of the present invention is that a method is provided which enhances informed decision making regarding subsequent designs in light of NVH performance objectives.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 2:
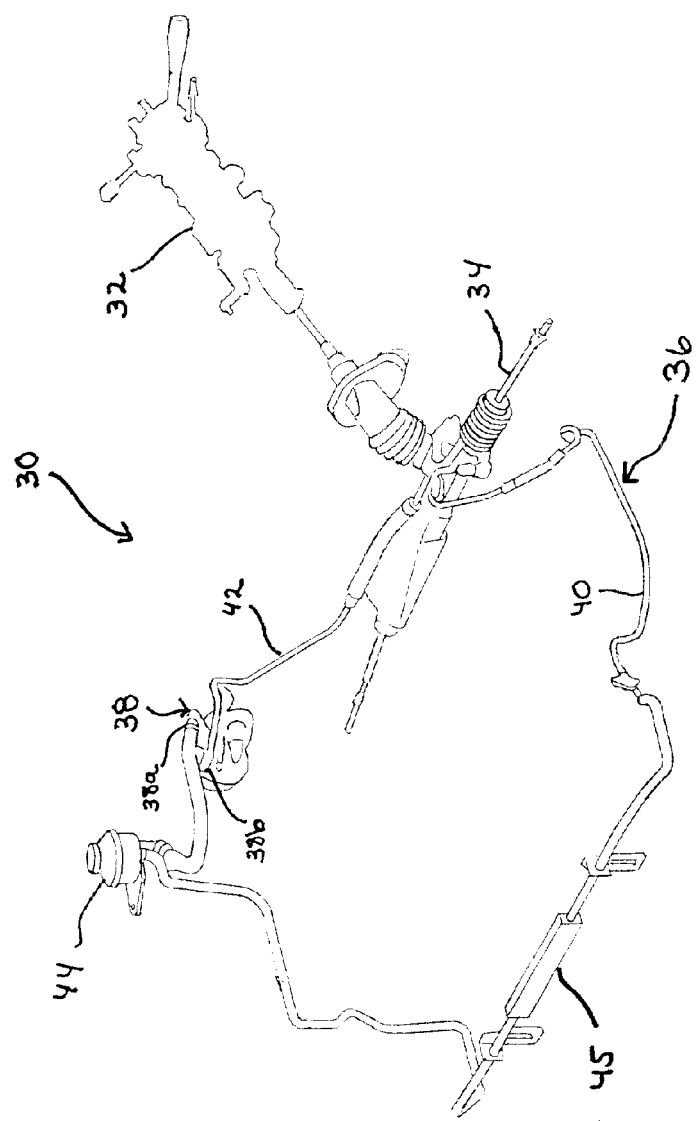
FIG. 2 is a perspective view of a power steering system for a vehicle, according to the present invention.

Referring to FIG. 2, the design of a power steering system 30, and in particular the design of a power steering hose assembly 42 for use on a vehicle, is achieved according to the present invention with a generic, parametric driven design method. Advantageously, this method allows flexibility in design of the power steering hose assembly 42 and engineering analysis of the design in a fraction of the time required using conventional design methods, since the design is automatically evaluated against rules in a knowledge base. Various computer-based tools are integrated into a single user interface to achieve this enormous time and expense savings, including solid modeling, parametric design, automated studies and a knowledge-based engineering library.

Figure 1:
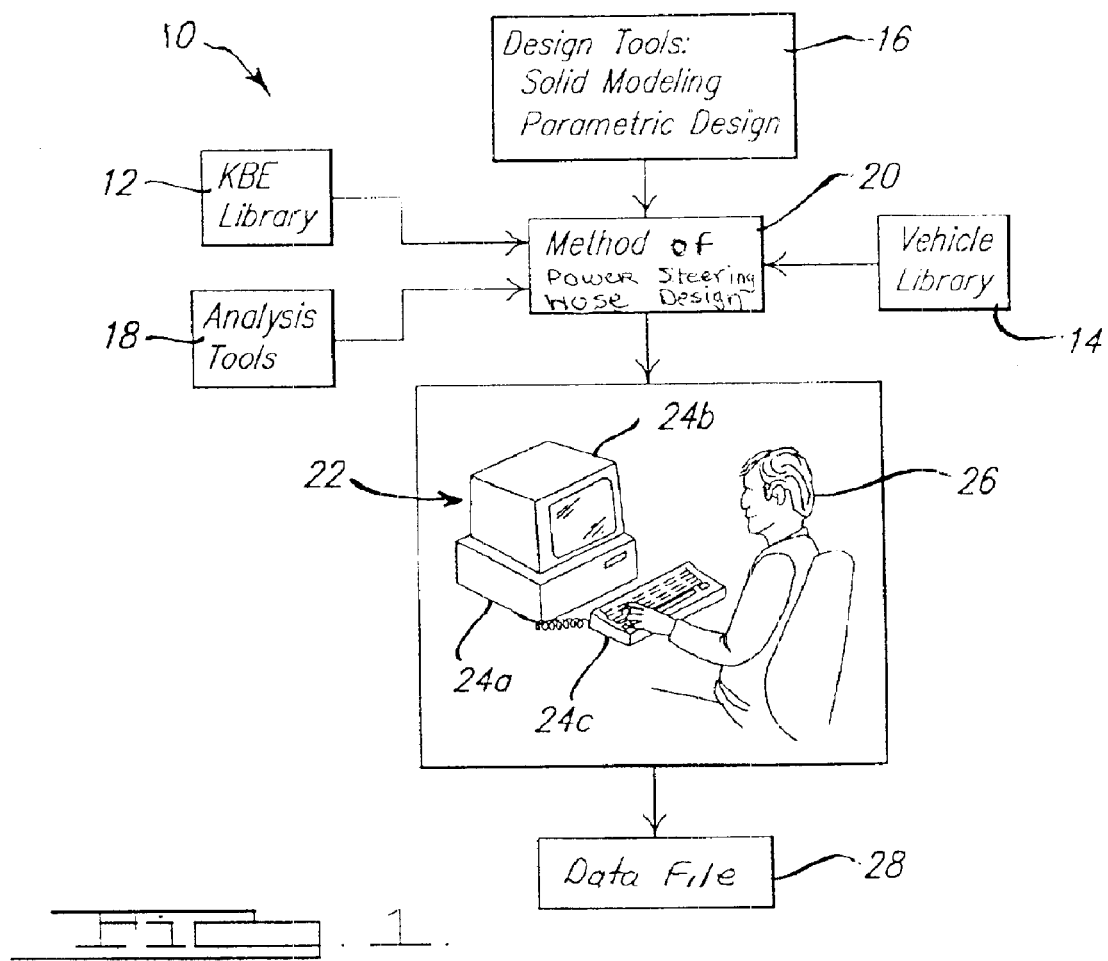
FIG. 1 is a block diagram of a system which may be utilized with a method of power steering hose assembly design and analysis, according to the present invention.

Referring to FIG. 1, the tools 10 used by a method of power steering hose assembly design and analysis, according to the present invention, are illustrated graphically. The tools 10 include a knowledge-based engineering library 12 stored on an electronic storage device (not shown). The knowledge-based engineering library 12 includes design, engineering, and assembly rules for a power steering system 30, including the power steering hose assembly 42. In this example, the knowledge-based engineering library 12 is a database of sub-libraries containing an electronic representation of various expert's knowledge of information relevant to the design of the power steering hose assembly 42. For example, the knowledge-based engineering library 12 includes a component parts library containing a database of various types of pumps 38, lines or hoses 40 available for use on the power steering system 30. The knowledge-based engineering library 12 may also provide interactive access to other web-based libraries.

The tools 10 also include a vehicle platform library 14 stored on the electronic storage device. The vehicle platform library 14 is an electrical representation of a vehicle platform or a portion thereof. For example, the vehicle platform library 14 may include a model of a particular vehicle body design, or a portion thereof such as a steering column. It should be appreciated that the vehicle platform library 14 may be a sub-library within the knowledge-based engineering library 12.

The tools 10 may also include various design tools 16, which can be used for this design method 20, in a manner to be described. These design tools 16 may include solid modeling and parametric design techniques. Solid modeling, for example, takes electronically stored vehicle design data from the vehicle platform library 14 and power steering hose assembly data from the knowledge-based engineering library 12 and builds a complex geometric system that can be used for NHV characteristic analysis. Several modeling programs are commercially available and generally known to those skilled in the art.

The parametric design technique is frequently used in the electronic construction of a geometrically defined vehicle component. It should be appreciated that the power steering hose assembly 42 may be parametrically modeled. As a particular dimension or parameter is modified for a particular feature of the power steering hose assembly 42, the computer system 22 is instructed to regenerate a new geometric model. The knowledge-based engineering library 12 is used to control and limit the design process in accordance with predetermined design parameters.

The tools 10 also include various computer-aided engineering (CAE) analysis tools 18. One example of a CAE analysis tool 18 is a finite element analysis software program, such as NASTRAN, SYSNOISE, or ABAQUS. Another example of a CAE analysis tool 18 is a visualization software program. Finite element analysis provides an acoustical analysis of the NVH characteristics of the power steering hose assembly 42. The finite element analysis program receives as an input a data file containing a mesh model of the power steering hose assembly 42 and predetermined conditions, as in known in the art. The output from the finite element analysis may be presented visually using the visualization software program.

The tools 10 further include the computer system 22 as is known in the art to implement a method of power steering hose assembly design and analysis 20, according to the present invention. The computer system 22 includes a processor and a memory 24a, which can provide a display and animation of a system, such as the power steering hose assembly 42, on a display device such as a video terminal 24b. Parametric selection and control for the design can be achieved by a user 26, via a user interactive device 24c, such as a keyboard or a mouse. The user 26 inputs a set of parameters and set of instructions into the computer system 22 when prompted to do so by the method 20. The set of parameters and the set of instructions may be product specific, wherein other data and instructions non-specific to the product may already be stored in the computer system 22.

One example of an input method is a pop-up window with all current parameters, including an online description for the parameter and a current value therefore. For example, parametric values may be chosen from a table within a two-dimensional mode, since some vehicle designers prefer to view an assembly in sections which can be laid out on a drawing.

Once the computer system 22 receives the set of parameters and instructions from a user 26, the computer system 22 utilizes a method, discussed in detail subsequently, to predict NVH characteristics of the power steering hose assembly 42. Advantageously, the computer implemented method of power steering hose assembly and analysis, according to the present invention, combines all of the foregoing to provide an efficient, flexible, and rapid design. Further, a data file 28 containing the NVH characteristics is an output of the method 20, and the data file 28 is available for further analysis and study.

Referring to FIG. 2, a power steering system 30 for a vehicle (not shown), and in particular a motor vehicle is illustrated. Advantageously, the power steering system 30 generates a hydraulic force to assist a driver (not shown) in steering the vehicle. The power steering system 30 includes a steering wheel (not shown) used by the driver to directionally control the vehicle. The steering wheel is operatively mounted to a steering column 32, and the steering column 32 is operatively attached to a steering gear, generally shown at 34. The steering gear 34 converts the directional rotation of the steering wheel to a linear motion, to control a drive wheel (not shown) of the vehicle.

The power steering system 30 also includes a closed loop energy assistance hydraulic system 36 that generates a hydraulic force to assist in operating the steering gear 34. The hydraulic system 36 includes a power steering pump 38 that generates and controls a hydraulic flow within the hydraulic system 36, such as a fixed displacement, rotary vane type pump. The power steering pump 38 includes an inlet side 38a for receiving a flow of fluid and an outlet side 38b for discharging the fluid flow. Further, operation of the power steering pump 38 inherently produces a pulse or pressure ripple that is transferred via the hydraulic fluid as fluid-borne noise. The pressure ripple interacts with the hydraulic system to create air-borne noise or structural vibration in another component in the power steering system 30. The resulting noise or vibration may be perceivable in the passenger compartment (not shown) of the vehicle.

The hydraulic system 36 further includes a line 40 or hose that transfers the hydraulic fluid within the system. It should be appreciated that a hydraulic hose assembly such as a high pressure power steering hose assembly 42 is positioned between the outlet side 38b of the power steering pump 38 and the steering gear 34. Preferably, the high pressure power steering hose assembly 42 includes an attenuation device (to be described), to reduce the level of the noise prior to reaching the steering gear 34. The hydraulic system 36 may include other lines 40 to complete the hydraulic circuit. It should be appreciated that the power steering system 30 is known and conventional in the art. Further, the power steering system 30 may include other components, such as a fluid reservoir 44, and a cooler 45 to carry out the function of the power steering system 30.

Figure 3:
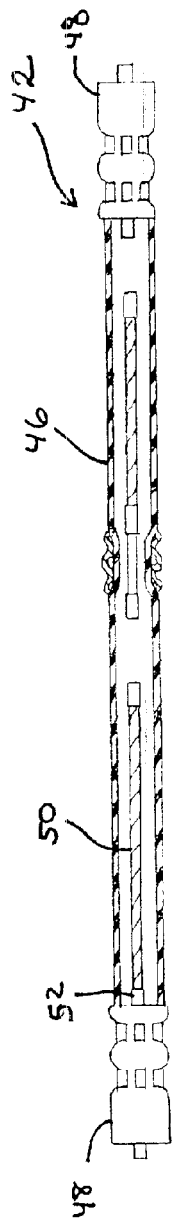
FIG. 3 is a fragmentary view of a power steering hose assembly for the power steering system of FIG. 2.

Referring to FIG. 3, the power steering hose assembly 42 is illustrated. Preferably, the power steering hose assembly 42 is a high pressure hose disposed between the outlet side 38b of the power steering pump 38 and the steering gear 34. The power steering hose assembly 42 includes a housing 46. The housing 46 is made from a flexible material, such as rubber. Advantageously, rubber is more compliant than steel, and the expansion of the housing walls assists in absorbing the energy of the pressure ripple. Also, by absorbing the energy of the pressure ripple, the housing 46 reduces the speed of sound in the fluid, thus shortening the pressure ripple wavelength and increasing the effectiveness of the attenuation device. The power steering hose assembly 42 includes a connector 48 located on each end of the housing 46 for connecting the power steering hose assembly 42 to another component within the power steering system, such as the power steering pump 38 or the steering gear 34.

The power steering hose assembly 42 further includes a noise attenuation device 50 disposed axially within an interior portion of the housing 46. The attenuation device 50 reduces a pressure ripple produced by the power steering pump 38 and transferred via the hydraulic fluid throughout the power steering system 30. An example of an attenuation device 50 is a tuning cable. The tuning cable 50 is a flexible cable made of a material such as steel. One or both ends of the tuning cable 50 are supported within the housing 46 by an attaching mechanism 52. An example of an attaching mechanism 52 is a ferrule and a band, as is known in the art.

The tuning cable 50 attenuates the pressure ripple through destructive interference. Preferably, the length of the cable 50 is chosen to be one-fourth the characteristic wavelength of the dominant pump pressure pulse order. Through a series of reflections, the cable 50 induces a 180° phase difference in the pump pressure ripple, enabling the noise in the power steering system 30 to cancel itself out.

Figure 4:
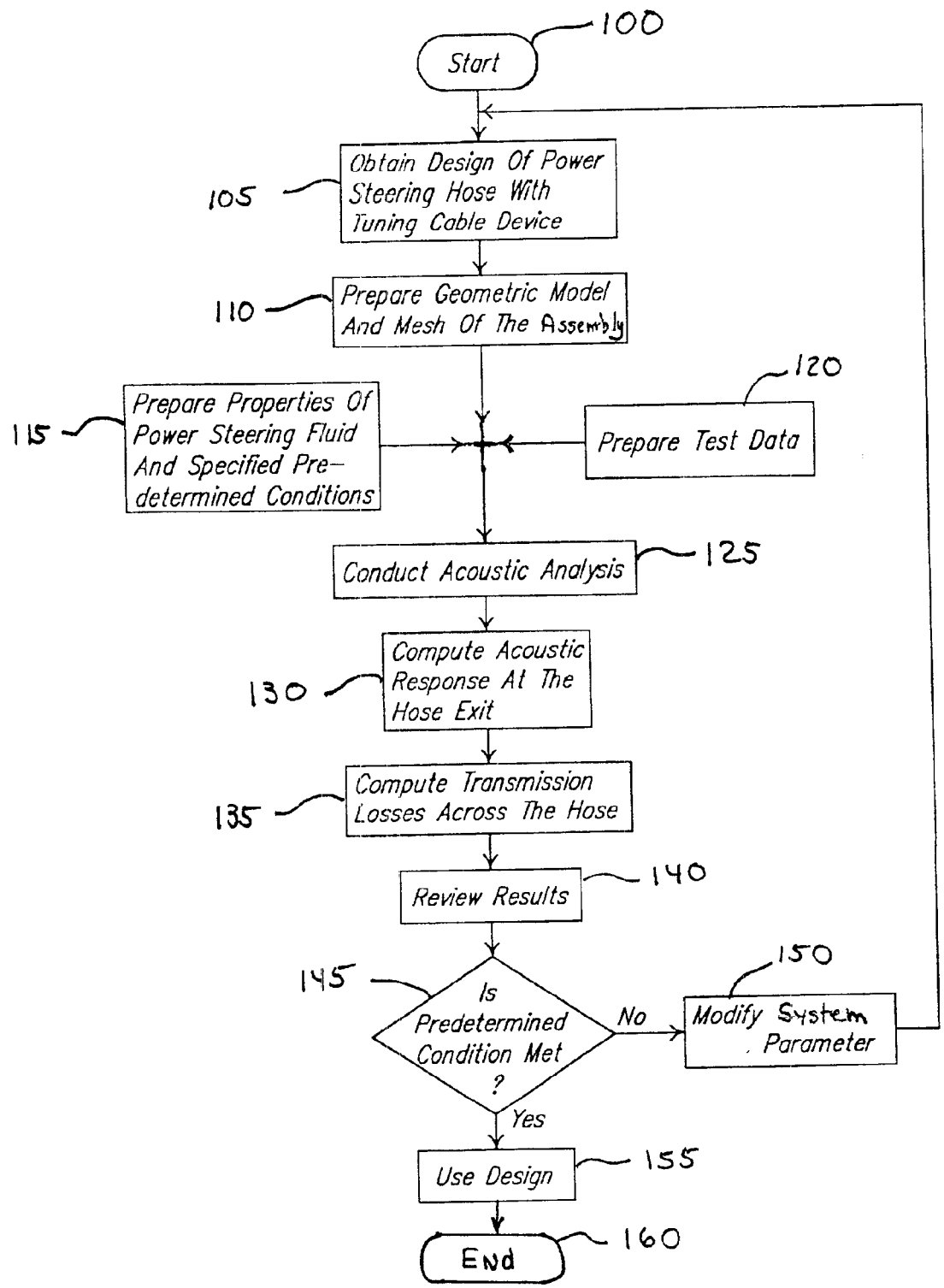
FIG. 4 is a flowchart illustrating a method of power steering hose assembly design and analysis, according to the present invention, for the power steering system of FIG. 2.

Referring to FIG. 4, a flowchart of a method of power steering hose assembly design and analysis is illustrated. Advantageously, the method provides for rapid and flexible modeling of the NVH characteristics of a power steering hose assembly 42. These NVH characteristics include transfer loss along the power steering hose, fluid flow characteristics, system vibration and modal prediction and airborne noise prediction. The method begins in bubble 100 and continues to block 105. In block 105, the methodology selects a design of the power steering system 30 and the power steering hose assembly 42. It should be appreciated that the design can be selected from the knowledge-based engineering library 12, or created using a design tool 16 such as computer aided design. The methodology advances to block 110.

In block 110, the methodology generates a mesh model of the power steering hose assembly design from the selected design. Preferably, a design tool 16 such as computer-aided design, is used to generate the mesh model. Preferably, the mesh model represents a fluid volume through which the pressure ripple travels for acoustic modeling purposes. It should be appreciated that since the volume inside the power steering hose assembly 42 is axial symmetric, that is, it has a uniform cross section along a central axis, only a quarter of the fluid volume need be analyzed. However, the structural mesh of the housing 46 cannot be simplified to take advantage of the axial symmetry. The methodology advances to block 115.

In block 115, the user 26 selects properties of the power steering system 30 for a predetermined operating condition of the vehicle. An example of a property is the pressure ripple data at the power steering pump inlet 38a and outlet 38b, or the structural characteristics of a line or hose 40. Another example of a property relating to the power steering fluid is material properties for the density, viscosity, and speed of sound in the fluid as a function of temperature and pressure. An example of a predetermined operating condition is an engine idle vehicle operating condition, since the pressure of the power steering fluid at the pump outlet 38b is high to maintain the operation of the power steering pump 38. It has been observed that power steering noise is more noticeable at vehicle operating conditions resulting in a higher outlet pump pressure. The methodology advances to block 120.

In block 120, the user 26 selects properties relating to predetermined characteristics of the power steering pump 38 for the predetermined operating condition of the vehicle, such as engine idle. An example of a predetermined pump characteristic is a sound pressure level in the power steering fluid for a particular power steering pump at idle. Preferably, the selected characteristics represent operating and boundary conditions for use by the analysis tools 18 in a manner to be described. The methodology advances to block 125.

In block 125, the methodology performs an acoustic analysis on the mesh model using the selected boundary and operating conditions for the power steering system 30. Preferably, an engineering analysis tool 18 such as finite element analysis (FEA) or boundary element analysis (BEA) is used to perform the acoustic analysis. The acoustic analysis provides data regarding the sound pressure level in the fluid at various locations within the power steering hose assembly 42. The methodology advances to block 130.

In block 130, the methodology determines an acoustic response at a predetermined location of the power steering hose assembly 42 using the FEA analysis. The acoustic response indicates a sound pressure level or noise level as a function of frequency. Preferably, a sound pressure level at an outlet portion of the power steering hose assembly 42 is calculated. The methodology advances to block 135.

In block 135, the methodology determines a noise transmission loss across the power steering hose assembly 42. Preferably, the transmission loss is determined as a difference between a predetermined sound pressure level in the power steering fluid at the power steering hose assembly inlet, and the calculated sound pressure level in the power steering fluid at the hose outlet. The methodology advances to block 140.

In block 140, the user 26 analyzes the transmission loss by comparing a computed peak frequency to a predetermined minimum peak frequency. Preferably, a lower minimum peak frequency correlates with a lower level of noise transmitted through the power steering hose assembly 42. The methodology advances to diamond 145.

In diamond 145, the user 26 determines whether the peak frequency meets a predetermined criterion. If the peak frequency is not acceptable, the methodology advances to block 150. In block 150, a parameter describing the power steering system is modified. An example of a parameter relating to the geometry of the tuning cable is length, diameter, or a location. An example of a parameter relating to a boundary condition is power steering pump outlet pressure. The methodology returns to block 105 and continues to evaluate the power steering hose assembly 42. Returning to diamond 145, if the peak frequency is acceptable, the methodology advances to block 155. In block 155, the design of the power steering hose assembly meets a peak frequency criterion, and the design and analysis are available for other use. The methodology advances to circle 160 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of power steering hose assembly design and analysis for a power steering system in a vehicle, said method comprising the steps of:
   obtaining a design for the power steering system from a database stored in a memory of a computer system, wherein the power steering system includes a power steering hose assembly having a noise attenuation device;
   selecting a mesh model of the power steering hose assembly from the power steering hose assembly design;
   obtaining a predetermined characteristic of the power steering system for a predetermined operating condition of the vehicle;
   performing an acoustic analysis on the mesh model of the power steering hose assembly using the predetermined characteristic;
   determining an acoustic response of the power steering hose assembly from the acoustic analysis;
   determining a noise transmission loss across the power steering hose assembly using the acoustic response;
   determining whether the transmission loss meets a predetermined noise criteria;
   modifying a design parameter for the power steering system if the transmission loss does not meet the predetermined noise criteria; and
   using the power steering hose assembly design and analysis if the transmission loss does meet the predetermined noise criteria.

2. A method as set forth in claim 1 wherein said step of obtaining the design for the power steering system includes the step of generating the mesh model of the power steering system using computer aided design.

3. A method as set forth in claim 1 wherein said step of selecting the predetermined characteristic of the power steering system includes the step of selecting a property of a power steering fluid for the power steering system at the predetermined operating condition.

4. A method as set forth in claim 1 wherein said step of selecting the predetermined characteristic of the power steering system includes the step of selecting a property of a power steering pump at the predetermined operating condition.

5. A method as set forth in claim 1 wherein said step of performing an acoustic analysis includes the step of using finite element analysis to perform the acoustic analysis.

6. A method as set forth in claim 1 wherein said step of determining an acoustic response of the power steering hose assembly includes the step of determining an acoustic response at an outlet portion of the power steering hose assembly.

7. A method as set forth in claim 1 wherein said step of determining the noise transmission loss includes determining a difference between the noise level at an inlet portion of the power steering hose assembly and an outlet portion of the power steering hose assembly.

8. A method as set forth in claim 1 wherein said step of determining whether the transmission loss meets the predetermined noise criteria includes the step of determining whether a peak frequency is minimized.

9. A method as set forth in claim 1 wherein said attenuation device is a tuning cable axially disposed within said power steering hose assembly.

10. A method of power steering hose assembly design and analysis for a power steering system in a vehicle, said method comprising the steps of:
    obtaining a design for the power steering system from a database stored in a memory of a computer system, wherein the power steering system includes a power steering hose assembly having a noise attenuation device;
    generating a mesh model of the power steering hose assembly from the power steering hose assembly design;
    obtaining a property of a power steering fluid for the power steering system at a predetermined operating condition of the vehicle;
    obtaining a property of a power steering pump for the power steering system at the predetermined operating condition;
    using finite element analysis and the predetermined characteristics of the power steering fluid and power steering pump to acoustically analyze the mesh model of the power steering hose assembly,
    determining an acoustic response at an outlet portion of the power steering hose assembly from the acoustic analysis;
    determining a noise transmission loss across the power steering hose assembly by determining a difference between the noise level at an inlet portion of the power steering hose assembly and an outlet portion of the power steering hose assembly;
    determining whether the transmission loss meets a predetermined noise criteria;
    modifying a design parameter for the power steering system if the transmission loss does not meet a predetermined noise criteria; and
    using a power steering hose assembly design and analysis if the transmission loss does meet the predetermined noise criteria.

11. A method as set forth in claim 10 wherein said step of obtaining the design for a power steering system includes the step of generating the mesh model of the power steering system using computer aided design.

12. A method as set forth in claim 10 wherein said step of determining whether the transmission loss meets the predetermined noise criteria includes the step of determining whether a peak frequency is minimized.

13. A method as set forth in claim 10 wherein said attenuation device is a tuning cable axially disposed within said power steering hose assembly.

14. A method of hydraulic hose assembly design and analysis for a hydraulic energy assistance system, said method comprising the steps of:

obtaining a design for the hydraulic energy assistance system from a database stored in a memory of a computer system, wherein the hydraulic energy assistance system includes a pump and a hydraulic hose assembly having a noise attenuation device;

generating a mesh model of the hydraulic hose assembly from the hydraulic hose assembly design;

obtaining a predetermined characteristic of the hydraulic energy assistance system for a predetermined operating condition;

performing an acoustic analysis on the mesh model of the hydraulic hose assembly using the predetermined characteristic;

determining an acoustic response of the hydraulic hose assembly from the acoustic analysis;

determining a noise transmission loss across the hydraulic hose assembly using the acoustic response;

modifying a design parameter for the hydraulic energy assistance system if the transmission loss does not meet a predetermined noise criteria; and using the hydraulic hose assembly design and analysis if the transmission loss does meet the predetermined noise criteria.

15. A method as set forth in claim 14 wherein said step of performing the acoustic analysis includes the step of using finite element analysis to perform the acoustic analysis.

16. A method as set forth in claim 14 wherein said step of determining the acoustic response of the hydraulic hose assembly includes the step of determining the acoustic response at an outlet portion of the hydraulic hose assembly.

17. A method as set forth in claim 14 wherein said step of determining whether the transmission loss meets the predetermined noise criteria includes the step of determining whether a peak frequency is minimized.

18. A method as set forth in claim 14 wherein said hydraulic energy assistance system is for a power steering system on a vehicle.

19. A method as set forth in claim 14 wherein said attenuation device is a tuning cable axially disposed within said hydraulic hose assembly.

* * * * *